United States Patent
Merzougui et al.

(10) Patent No.: US 9,991,523 B2
(45) Date of Patent: Jun. 5, 2018

(54) FUEL CELL CATALYST INCLUDING CARBON SUPPORT PARTICLES WITH METAL CARBIDE LAYER AND CATALYTIC MATERIAL AND FUEL CELL USING THE SAME

(71) Applicant: Audi AG, Ingolstadt (DE)

(72) Inventors: Belabbes Merzougui, Dhahran (SA); Minhua Shao, Manchester, CT (US); Lesia V. Protsailo, Bolton, CT (US); Jingguang Chen, Hockessin, DE (US)

(73) Assignee: Audi AG, Ingolstadt (DE)

( * ) Notice: Subject to any disclaimer, the term of this patent is extended or adjusted under 35 U.S.C. 154(b) by 263 days.

(21) Appl. No.: 14/828,243

(22) Filed: Aug. 17, 2015

(65) Prior Publication Data
US 2015/0357654 A1     Dec. 10, 2015

Related U.S. Application Data

(63) Continuation of application No. 13/635,423, filed as application No. PCT/US2010/034166 on May 10, 2010, now Pat. No. 9,147,884.

(51) Int. Cl.
*H01M 4/92* (2006.01)
*B01J 21/18* (2006.01)
*B01J 23/42* (2006.01)
*B01J 27/22* (2006.01)

(52) U.S. Cl.
CPC ............. *H01M 4/92* (2013.01); *H01M 4/925* (2013.01); *Y02E 60/50* (2013.01)

(58) Field of Classification Search
CPC ............................... H01M 4/92; H01M 4/925
USPC ...................... 429/532; 502/177, 182, 185
See application file for complete search history.

(56) References Cited

U.S. PATENT DOCUMENTS

| | | |
|---|---|---|
| 5,308,597 A | 5/1994 | Ledoux et al. |
| 5,451,557 A | 9/1995 | Sherif |
| 5,573,991 A | 11/1996 | Sherif |
| 6,576,363 B1 | 6/2003 | Hitomi |
| 8,278,011 B2 | 10/2012 | Zhu et al. |
| 8,679,704 B2 | 3/2014 | Shao et al. |
| 9,147,884 B2 | 9/2015 | Merzougui et al. |
| 9,153,823 B2 | 10/2015 | Shao et al. |
| 2003/0059666 A1 | 3/2003 | Kourtakis |
| 2005/0282061 A1 | 12/2005 | Campbell |
| 2006/0019146 A1 | 1/2006 | Yoshitake et al. |

(Continued)

FOREIGN PATENT DOCUMENTS

| | | |
|---|---|---|
| JP | 2003-117398 A | 4/2003 |
| JP | 2003-346814 A | 12/2003 |

(Continued)

OTHER PUBLICATIONS

Ono, Masaki, Machine translation of JP 2004-172107 A, Jun. 2004.*

(Continued)

*Primary Examiner* — Sean P Cullen
(74) *Attorney, Agent, or Firm* — Seed IP Law Group LLP

(57) ABSTRACT

A supported catalyst includes a plurality of support particles that each include a carbon support and a layer disposed around the carbon support. The layer is selected from a metal carbide, metal oxycarbide, and combinations thereof. A catalytic material is disposed on the layers of the support particles.

20 Claims, 2 Drawing Sheets

(56) References Cited

U.S. PATENT DOCUMENTS

| | | | |
|---|---|---|---|
| 2007/0248862 A1 | 10/2007 | Park et al. | |
| 2011/0195347 A1 | 8/2011 | Querner et al. | |
| 2012/0015284 A1 | 1/2012 | Merzougui et al. | |
| 2012/0058417 A1 | 3/2012 | Shao et al. | |
| 2013/0011771 A1 | 1/2013 | Merzougui et al. | |

FOREIGN PATENT DOCUMENTS

| | | | |
|---|---|---|---|
| JP | 2004-172107 A | 6/2004 | |
| JP | 2005-78978 A | 3/2005 | |
| JP | 2005-519755 A | 7/2005 | |
| JP | 2008-21609 A | 1/2008 | |
| JP | 2008-503869 A | 2/2008 | |
| JP | 2013-518710 A | 5/2013 | |
| WO | 03/083963 A2 | 10/2003 | |
| WO | 2006/002228 A2 | 1/2006 | |
| WO | 2011/095943 A1 | 8/2011 | |

OTHER PUBLICATIONS

International Preliminary Report on Patentability, dated Nov. 13, 2012, for International Application No. PCT/US2010/034166, 8 pages.
International Search Report, dated Feb. 18, 2011, for International Application No. PCT/US2010/034166, 2 pages.
International Search Report and Written Opinion, dated Feb. 11, 2010, for International Application No. PCT/US2009/002985, 6 pages.
Machine Translation, Japanese Application No. 2005-78978, dated Mar. 24, 2005, 9 pages.

\* cited by examiner

FUEL CELL CATALYST INCLUDING CARBON SUPPORT PARTICLES WITH METAL CARBIDE LAYER AND CATALYTIC MATERIAL AND FUEL CELL USING THE SAME

CROSS-REFERENCE TO RELATED APPLICATION

This application is a continuation of U.S. patent application Ser. No. 13/635,423, filed on Sep. 15, 2012, now U.S. Pat. No. 9,147,884, which is a national stage application, filed under 35 U.S.C. § 371, of International Application No. PCT/US10/34166, filed on May 10, 2010, the contents all of which are incorporated herein by reference in their entireties.

BACKGROUND

Technical Field

This disclosure relates to supported catalysts having high activity and that are stable under relatively severe operating conditions.

Description of the Related Art

Fuel cells and other types of devices commonly utilize electroactive materials. For instance, a typical fuel cell may include an anode catalyst, a cathode catalyst, and an electrolyte between the anode and the cathode catalysts for generating an electric current in a known electrochemical reaction between a fuel and an oxidant. The catalytic material, such as platinum, is typically supported on carbon particles.

BRIEF SUMMARY

An example supported catalyst includes a plurality of support particles that each includes a carbon support and a layer disposed around the carbon support. The layer is selected from a metal carbide, metal oxycarbide, and combination thereof. A catalytic material is disposed on the layers of the support particles.

Disclosed also is a fuel cell having an electrolyte, an anode catalyst, and a cathode catalyst. The anode and cathode catalysts are disposed on respective opposing sides of the electrolyte. Interconnects are located adjacent to the anode catalyst and the cathode catalyst to deliver reactants. At least one of the anode or cathode catalysts may include the supported catalyst.

BRIEF DESCRIPTION OF THE SEVERAL VIEWS OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
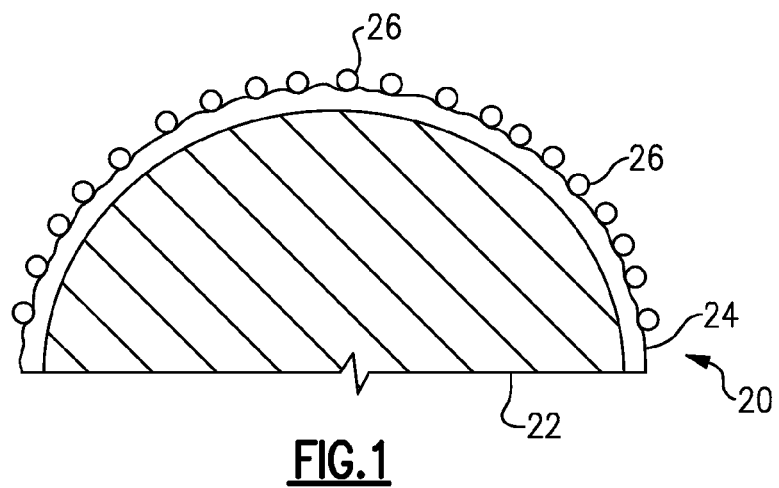
FIG. 1 illustrates an example of supported catalyst.

FIG. 1 illustrates selected portions of an example supported catalyst 20. As an example, the supported catalyst 20 may be used in a fuel cell for generating electricity, in a petrochemical treatment device, or in any other type of device that would benefit from the addition of a stable, high activity catalyst.

The supported catalyst 20 includes a carbon support 22, such as a carbon particle, and a layer 24 disposed partly or completely around the carbon support 22. The layer 24 is a material selected from a metal carbide, metal oxycarbide, or combination thereof. The "metal carbide" and "metal oxycarbide" may, respectively, refer to compounds that include one or more types of metal atoms with carbon atoms covalently bonded to the metal atoms and one or more types of metal atoms with carbon atoms and oxygen atoms covalently bonded to the metal atoms. FIG. 1 illustrates a portion of the carbon support 22; however, the layer 24 is understood to extend partly or entirely around the carbon support 22.

A catalytic material 26 is disposed on the layer 24 of the supported catalyst 20. In this case, the catalytic material 26 includes particles of a catalytic metal, such as platinum. The platinum may be a platinum alloy. In the illustrated example, a single particle is shown. However, it is to be understood that the supported catalyst 20 may include a plurality of such particles.

In one example, the carbon support 22 is comprised substantially of carbon material but may include an aromatic carbon surface structure with oxygen and/or hydroxyl side groups. The surface of the carbon support 22 may be modified with fluorine, phosphorus, boron, etc. The carbon support 22 may be, for instance, a high surface area carbon particle. The carbon support 22 may have an average surface area of 100-2500 $m^2/g$. In other examples the carbon support 22 may have an average surface area of approximately 250-1000 $m^2/g$. The relatively high surface area facilitates increasing exposure of the catalytic material 26 to the reactants.

The metal of the layer 24 may be a transition metal or combinations thereof. In some examples, the metal may be cobalt, nickel, tantalum, niobium, tungsten, titanium, zirconium, molybdenum, or combinations thereof. The supported catalyst 20 may include only a single type of the example metals. For instance, tungsten carbide and/or tungsten oxycarbide may provide good electrical conductivity and corrosion protection of the carbon support 22.

The supported catalyst 20 may alternatively include combinations of the example metals to provide benefits from each individual type of metal. In some examples, the metal of the layer 24 may include nickel/molybdenum or tungsten/titanium. That is, certain materials may provide enhancement of activity while others may contribute to enhancement of corrosion resistance. Thus, using a combination of two or more of the exemplary metal carbides and/or oxycarbides provides the ability to tailor the electrical, corrosion, stability, or other properties of the layer 24 to meet the needs of a particular end use application.

The exemplary metal carbides form sub-stoichiometric oxides in the layer 24. The sub-stoichiometric oxides are generally semi-electrically conductive, which is desired for many end uses (e.g., fuel cells). For instance, the layer 24 has a sub-stoichiometric amount of oxygen with regard to an amount of the metal or metals in the composition because a portion of the metal valence sites for bonding are taken up with bonds to the carbon atoms (i.e., carbide).

The catalytic material 26 may include a catalytic metal or catalytic alloy suited for the intended end use. In some examples, the catalytic material 26 may include platinum or platinum alloys, such as binary, ternary or quaternary alloys.

The platinum or alloy elements are in metallic form, rather than an oxide, carbide, or other compound form.

The supported catalyst 20 may be developed from starting materials of carbon particles and a transition metal starting material. For instance, the transition metal starting material may be a powder that includes the selected transition metal or metals in oxide form. In one example based on tungsten, the starting material may be a powder of tungsten oxide ($WO_3$). The tungsten oxide powder may be mixed with a carrier solvent to form a slurry. Also, the starting materials can be salts such as ammonium metatungstate, which is soluble in water. The carbon particles are then mixed with the slurry, and the solvent is then removed by evaporation such that the tungsten oxide particles or tungsten salt remain as deposits on the surfaces of the carbon particles. Other types of metals or combinations of metals may be deposited in a similar manner and may be deposited separately or at the same time using a single slurry.

The intermediate product of the carbon particles with the tungsten oxide/tungsten salt (or other transition metal starting materials) on the surfaces is then further processed in a reducing atmosphere at an elevated temperature to bond the metal(s) to the carbon particles. For instance, the reducing atmosphere may include a mixture of hydrogen and methane and the treatment temperature may be approximately 950° C. A 4:1 ratio mixture of hydrogen and methane may be used. In one example, the treatment time may be approximately eight hours, however, the temperature, time, and gas mixture ratio may vary depending on the type of transition metal starting materials selected.

The methane reacts with the transition metal starting material to form a metal-methyl intermediate, which is reactive with the surface of the carbon particles to covalently bond the metal(s) thereto. In some examples, the surface of the carbon particles includes an aromatic carbon structure with oxygen and/or hydroxyl side groups that serve as potential bonding sites for reaction with the metal-methyl intermediate. In this regard, the tungsten or other metal displaces the oxygen or hydroxyl group and covalently bonds with the aromatic surface structure to form a metal carbide on the surface of the carbon particles. In this process, only the surface atoms in the carbon support 22 are sacrificed and hence maintain its high BET area. For example, the initial BET area of the carbon support 22 is ~800 $m^2/g$. After depositing 30% of tungsten carbide on the carbon support 22, the BET area is ~450 $m^2/g$. On the other hand, the Campbell's process forms large carbide particles and significantly reduces the BET area by converting almost all the carbon atoms to carbides. A phase pure tungsten carbide (WC), rather than tungsten carbide ($W_2C$) or a mixture with other metals or carbides, is formed using the disclosed method. The tungsten carbide (WC) is desired for the fuel cell application since it is more stable than tungsten carbide ($W_2C$) at high potentials.

The carbon particles and tungsten carbide or other metal carbide on the surface may form a passive layer and then be further treated in an oxygen atmosphere to transform the carbide into oxycarbide (i.e., the layer 24). The oxygen may alternatively be introduced during operation of the end use device. In one example based on a fuel cell application, the supported catalyst 20 in the fuel cell may initially include a metal carbide layer. Fuel cells operate at elevated temperatures, which transform the carbide layer into the layer 24 with exposure to oxygen and/or water vapor in the electrode. The catalytic material 26 may be deposited onto the outer surfaces of the layer 24 or, alternatively, onto the metal carbide layer prior to forming the oxycarbide. In either case, the catalytic material 26 may be deposited using known deposition techniques for depositing such materials onto the surfaces of the carbon particles.

The disclosed arrangement provides enhanced adhesion of the catalytic material 26 and thereby facilitates enhancing stability by reducing migration of the catalytic material 26. That is, the layer 24 includes surface charges from the presence of electronegative oxygen elements, which facilitate holding the catalytic material 26 on the layer 24 and limiting agglomeration of the catalytic material 26. In comparison, platinum tends to migrate on the surface of carbon particles to form larger sized platinum agglomerates that reduce mass activity of the platinum. However, the strong adhesion between the layer 24 and the catalyst material 26 of the disclosed arrangement reduces migration and thereby facilitates maintaining mass activity over longer periods of time. The layer 24 further functions as a passivating layer to inhibit movement of oxygen or other corrosive elements to the carbon support 22. That is, the layer 24 acts in such a way as to provide a protective layer over the carbon support 22.

Figure 2:
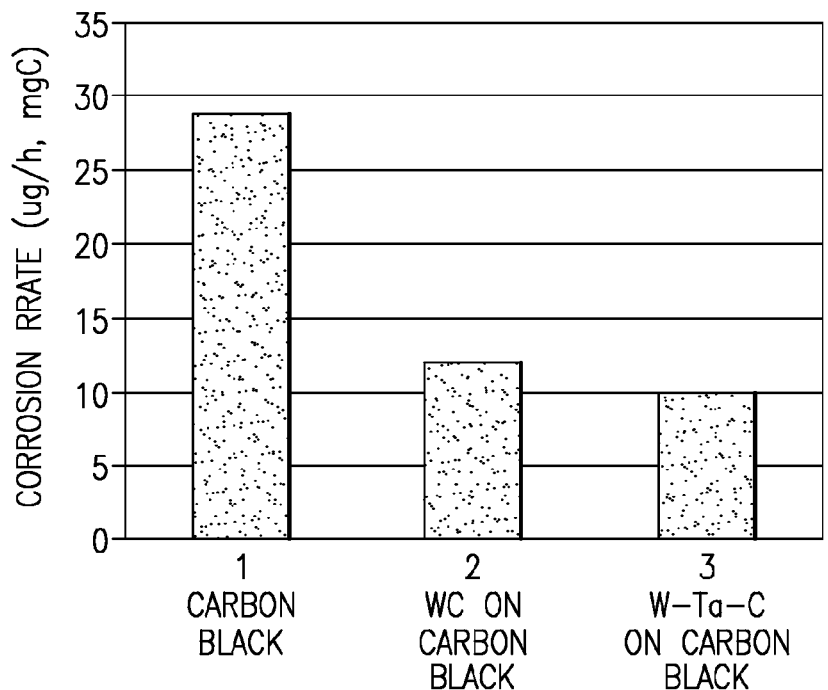
FIG. 2 illustrates the corrosion rate of carbon supports with and without carbide on the surface.

FIG. 2 illustrates the difference in corrosion rate between carbon and metal carbide coated carbon. In this example, tungsten carbide and tungsten-tantalum modified carbon exhibit an approximately 30% drop in corrosion rate. This indicates that metal carbides may form oxide layers that act as protective to carbon support.

Figure 3:
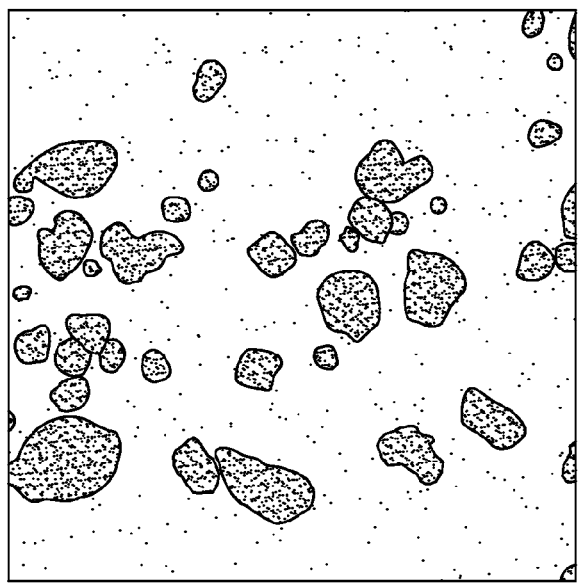
FIG. 3 illustrates a transmission electron micrograph of 60% tungsten carbide on a carbon support.

FIG. 3 illustrates a transmission electron micrograph of a 60 wt % tungsten carbide coated carbon support. The particle sizes of the tungsten carbide are ranged between 2 and 80 nm. The particle size distribution and particle sizes depend on the precursors and carburization time. The particle size and distribution can be further tuned by adding other transition metals in it. For example, the particle size of tungsten carbide may be less than 5 nm by adding cobalt or nickel salts in the tungsten precursors.

Figure 4:
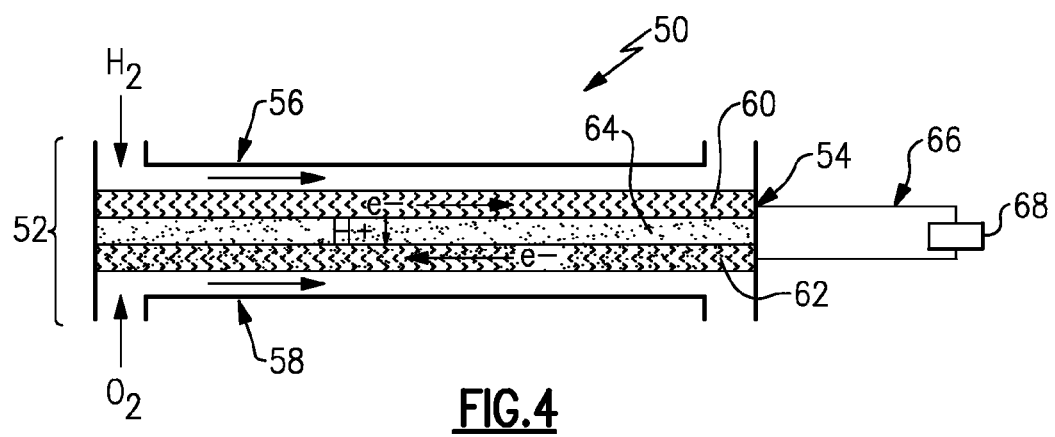
FIG. 4 illustrates an example of fuel cell that uses a supported catalyst.

FIG. 4 schematically illustrates selected portions of an example fuel cell 50. In this example, a single fuel cell unit 52 is shown, however, it is to be understood that multiple fuel cell units 52 may be stacked in a known manner in the fuel cell 50 to generate a desired amount of electric power. It is also to be understood that this disclosure is not limited to the arrangement of the example fuel cell 50, and the concepts disclosed herein may be applied to other fuel cell arrangements or to other catalytic devices.

The fuel cell 50 includes an electrode assembly 54 located between an anode interconnect 56 and a cathode interconnect 58. For instance, the anode interconnect 56 may deliver fuel, such as hydrogen gas, to the electrode assembly 54. Likewise, the cathode interconnect 58 may deliver oxygen gas, such as air, to the electrode assembly 54. In this regard, the anode interconnect 56 and the cathode interconnect 58 are not limited to any particular structure, but may include channels or the like for delivering the reactant gases to the electrode assembly 54.

The electrode assembly 54 includes an anode catalyst 60, a cathode catalyst 62, and an electrolyte 64 located between the anode catalyst 60 and the cathode catalyst 62. The electrolyte 64 may be any suitable type of electrolyte for conducting ions between the anode catalyst 60 and the cathode catalyst 62 in an electrochemical reaction to generate the electric current. In a few examples, the electrolyte 64 may be a polymer electrolyte membrane, a solid oxide electrolyte, or other type of electrolyte, such as $H_3PO_4$.

As is generally known, the hydrogen at the anode catalyst 60 disassociates into protons that are conducted through the electrolyte 64 to the cathode catalyst 62 and electrons that flow through an external circuit 66 to power a load 68, for example. The electrons from the external circuit 66 combine with the protons and oxygen at the cathode catalyst 62 to form a water byproduct. In this example, the anode catalyst 60, the cathode catalyst 62, or both may be comprised of the supported catalyst 20 of the prior examples. As described above, the supported catalyst 20 is stable and highly active under elevated temperature and corrosive conditions, such as those found within the fuel cell 50.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A supported catalyst, comprising:
    a plurality of support particles, the support particles each including a carbon support and a layer disposed around the carbon support, the layer being selected from a group consisting of metal carbide, metal oxycarbide, and combinations thereof, a metal of the layer consists of tungsten and titanium; and
    a catalytic material directly attached to the layer of each of the support particles, the catalytic material being separated from the carbon support of each support particle by the layer.

2. The supported catalyst of claim 1 wherein the layer selected from the group consisting of metal carbide, metal oxycarbide, and combinations thereof is metal carbide.

3. The supported catalyst of claim 1 wherein the layer selected from the group consisting of metal carbide, metal oxycarbide, and combinations thereof is metal oxycarbide, the metal oxycarbide being formed by treatment of the metal in an oxygen environment.

4. The supported catalyst of claim 1 wherein the layer includes a sub-stoichiometric amount of oxygen relative to an amount of the metal in the layer.

5. The supported catalyst of claim 1 wherein the layer includes surface charges from a presence of an electronegative oxygen element.

6. The supported catalyst of claim 1 wherein the catalytic material comprises platinum.

7. The supported catalyst of claim 1 wherein the metal of the layer includes particles having a particle size less than 100 nm.

8. The supported catalyst of claim 1 wherein the metal of the layer includes particles having a particle size less than 30 nm.

9. The supported catalyst of claim 1 wherein the metal of the layer includes particles having a particle size less than 10 nm.

10. The supported catalyst of claim 1 wherein the carbon supports have an average surface area of 100-2500 $m^2/g$.

11. A fuel cell, comprising:
    an electrolyte;
    an anode catalyst and a cathode catalyst disposed on respective opposing sides of the electrolyte; and
    an anode interconnect located adjacent to the anode catalyst; and
    a cathode interconnect located adjacent to the cathode catalyst, the anode and cathode interconnects being configured to deliver reactants, at least one of the anode catalyst or the cathode catalyst including a plurality of support particles, the support particles each having a carbon support and a layer disposed around the carbon support, the layer being selected from a group consisting of metal carbide, metal oxycarbide, and combinations thereof, wherein a metal of the layer consists of tungsten and titanium, and a catalytic material directly attached to the layers of the support particles.

12. The fuel cell of claim 11 wherein the layer selected from the group consisting of metal carbide, metal oxycarbide, and combinations thereof is metal carbide.

13. The fuel cell of claim 11 wherein the layer selected from the group consisting of metal carbide, metal oxycarbide, and combinations thereof is metal oxycarbide, and wherein the fuel cell includes an oxygen environment configured to transform the layer into the metal oxycarbide.

14. The fuel cell of claim 11 wherein the layer includes a sub-stoichiometric amount of oxygen relative to an amount of the metal in the layer.

15. The fuel cell of claim 11 wherein the layer includes surface charges from a presence of an electronegative oxygen element.

16. The fuel cell of claim 11 wherein the catalytic material comprises platinum.

17. The fuel cell of claim 11 wherein the metal of the layer includes particles having a particle size less than 100 nm.

18. The fuel cell of claim 11 wherein the metal of the layer includes particles having a particle size less than 30 nm.

19. The fuel cell of claim 11 wherein the metal of the layer includes particles having a particle size less than 10 nm.

20. The fuel cell of claim 11 wherein the carbon supports have an average surface area of 100-2500 $m^2/g$.

* * * * *